(12) United States Patent
Tu

(10) Patent No.: US 9,044,120 B1
(45) Date of Patent: Jun. 2, 2015

(54) SPICE GRINDER

(71) Applicant: Hsieh-Min Tu, Tainan (TW)

(72) Inventor: Hsieh-Min Tu, Tainan (TW)

( * ) Notice: Subject to any disclaimer, the term of this patent is extended or adjusted under 35 U.S.C. 154(b) by 0 days.

(21) Appl. No.: 14/480,761

(22) Filed: Sep. 9, 2014

(51) Int. Cl.
*A47J 42/10* (2006.01)
*A47J 42/34* (2006.01)
*A47J 42/32* (2006.01)
*A47J 42/36* (2006.01)

(52) U.S. Cl.
CPC . *A47J 42/34* (2013.01); *A47J 42/32* (2013.01); *A47J 42/36* (2013.01)

(58) Field of Classification Search
CPC ............ A47J 42/32; A47J 42/34; A47J 42/36
USPC ....................... 241/168, 169, 169.1
See application file for complete search history.

(56) References Cited

U.S. PATENT DOCUMENTS

| | | | | |
|---|---|---|---|---|
| 4,588,136 A * | 5/1986 | Homma | | 241/95 |
| 6,196,481 B1 * | 3/2001 | Barbagli | | 241/30 |
| 7,604,191 B2 * | 10/2009 | Pai | | 241/169.1 |
| 8,534,579 B2 * | 9/2013 | Carapelli | | 241/169.1 |
| 2005/0017109 A1 | 1/2005 | Tu | | |
| 2008/0315022 A1 * | 12/2008 | Wilson et al. | | 241/169.1 |
| 2009/0134256 A1 * | 5/2009 | Rice | | 241/169.1 |
| 2012/0286081 A1 * | 11/2012 | Delbridge et al. | | 241/169.1 |

* cited by examiner

*Primary Examiner* — Faye Francis
(74) *Attorney, Agent, or Firm* — Rosenberg, Klein & Lee

(57) ABSTRACT

A spice grinder is revealed. The spice grinder includes a base connected to a bottom of a container body, an inner grinding member, and an outer grinding member arranged between the container body and the base. The inner grinding member includes a plurality of grinding blades. Each grinding blade has an insertion hole on a center thereof. A rod of a fixing shaft is inserted through the insertion hole of each grinding blade. Thus a first fixing block on one end of the fixing shaft and a second fixing block on other end thereof are against a top and a bottom of the inner grinding member respectively. While in use, the container body and the base are rotated to drive the inner and the outer grinding members. Thus granular spices are ground gradually by the grinding blades. Therefore the granular spices are broken into fine grains precisely.

10 Claims, 5 Drawing Sheets

SPICE GRINDER

BACKGROUND OF THE INVENTION

1. Fields of the Invention

The present invention relates to a grinder, especially to a spice grinder that grinds granular spices into fine grains.

2. Descriptions of Related Art

Refer to US Pat. App. Pub. No. US20050017109 A1 "Grinding tool", a force is applied to an actuating wheel by user's fingers. A toothed grinding wheel is driven to move by a transmission shaft connected to the actuating wheel. Thus granular spices such as peppercorns, salt, etc. are ground with the grinding wheel and two stationary grinding members. However, the force applied by the fingers is weak. When the granular spices are locked between the grinding wheel and two stationary grinding members, users need to take a lot of energy for driving the grinding wheel and crushing the spices into small pieces. This causes inconvenience to female users lack of enough strength. Sometimes the grinding tool even causes discomfort and pain in users fingers. Moreover, the granular spices from the container may be not ground completely by the only the grinding wheel and the two stationary grinding members due to the position the granular spices fallen. Thus the spices are unable to enhance the food's flavor.

SUMMARY OF THE INVENTION

Therefore it is a primary object of the present invention to provide a grinder by which granular spices are ground into fine grains conveniently.

In order to achieve the above object, a spice grinder of the present invention mainly includes a container body with a hollow receiving space thereof, a base having a hollow material-out space and connected to the bottom of the container body, an inner grinding member and an outer grinding member. The inner grinding member and the outer grinding member are mounted between the container body and the base, and their positions are corresponding to each other.

The inner grinding member is formed by a plurality of grinding blades 23 overlapped. The teeth around a circumference of each grinding blade are not overlapped with others. An insertion hole is formed on a center of each grinding blade. A rod of a fixing shaft is inserted through the insertion hole of each grinding blade correspondingly. A first fixing block is formed on one end of the rod while the other end of the rod is arranged with a fastening hole for mounting a fastener. One end of the fastener is mounted in the fastening hole and connected to the rod while the other end of the fastener is disposed with a second fixing block. Thus the grinding blades of the inner grinding member are clamped and positioned between the first fixing block of the fixing shaft and the second fixing block.

Thereby granules spices are drawn from the container body and ground gradually by each grinding blade. Then the ground spices emerge from the bottom of the grinder. After being ground multiple times, the granular spices are broken into fine grains. Then the fine grains are further ground into smaller grains or even powder by a smaller gap between the toothed discs and the circular grinding blades of the outer grinding member. Furthermore, the force applied is not only by hand but also by wrist. Thus the spices are ground more easily and conveniently. At the same time, the use of the grinder will not result pain in the hand.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
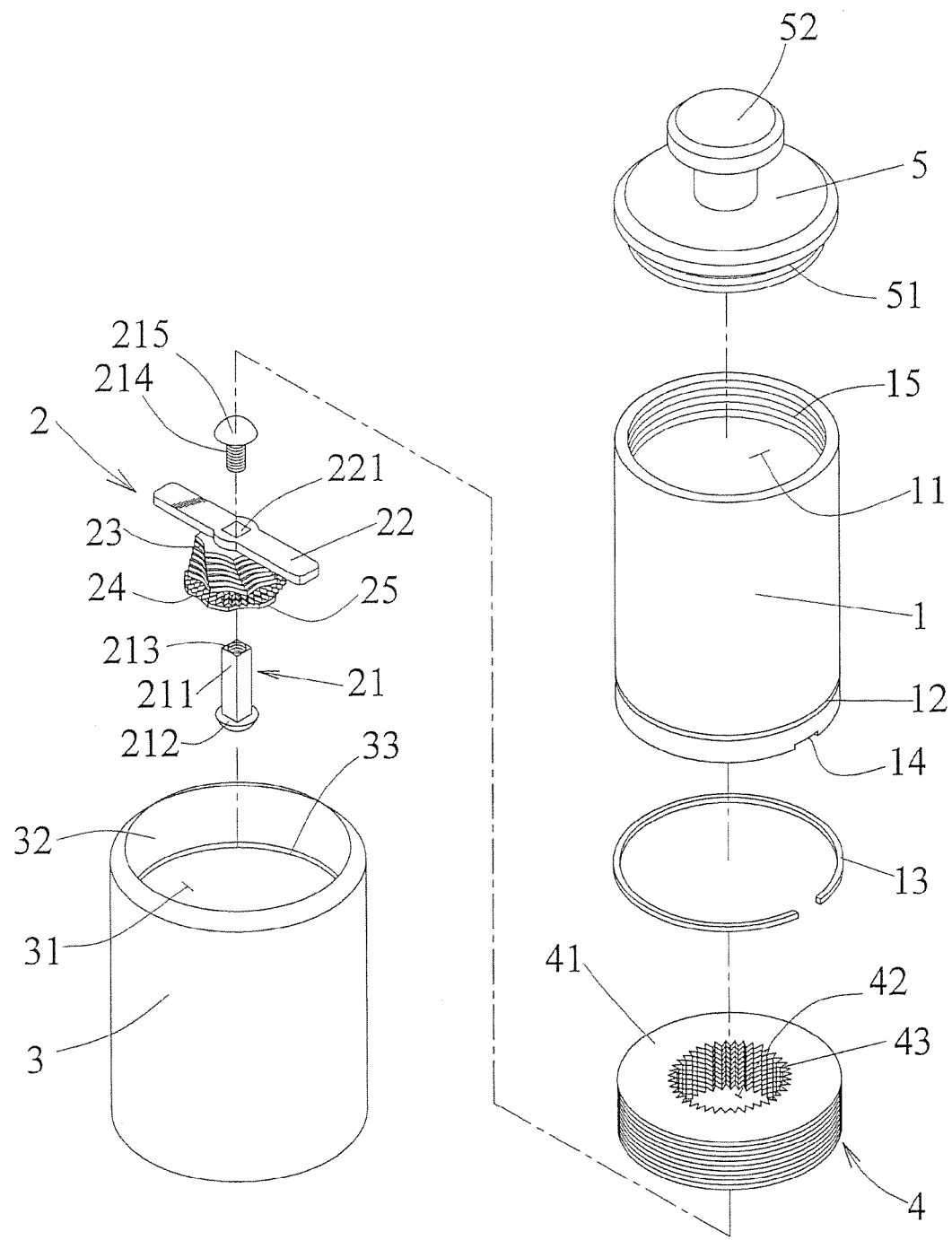
FIG. 1 is a perspective view of an embodiment according to the present invention.

Refer to FIG. 1, a spice grinder of the present invention includes a container body 1, an inner grinding member 2, a base 3, an outer grinding member 4 and a top cover 5.

The container body 1 consists of a hollow receiving space 11 formed on a center thereof, a circular groove 12 disposed on a lower part thereof, a C-shaped retaining ring 13 mounted in the circular groove 12, two mounting holes 14 arranged at the bottom edge thereof and opposite to each other, and an inner threaded portion 15 formed on a sidewall of an upper part of the receiving space 11.

Figure 2:
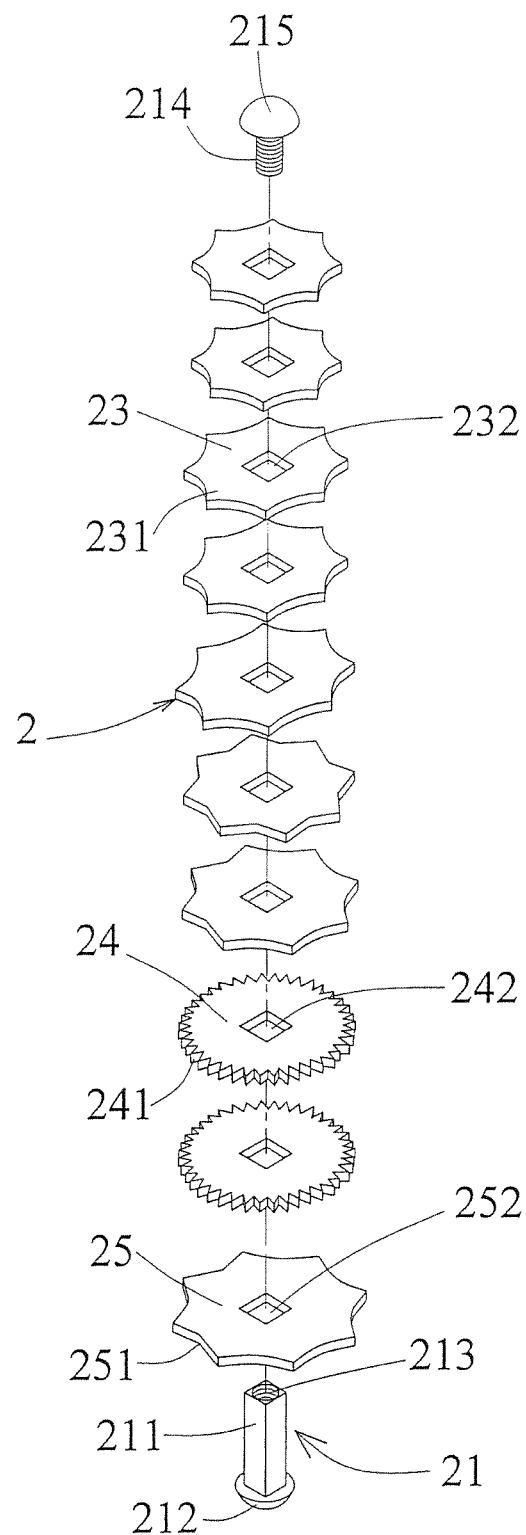
FIG. 2 is an explosive view of an inner grinding member of an embodiment according to the present invention.
Figure 3:
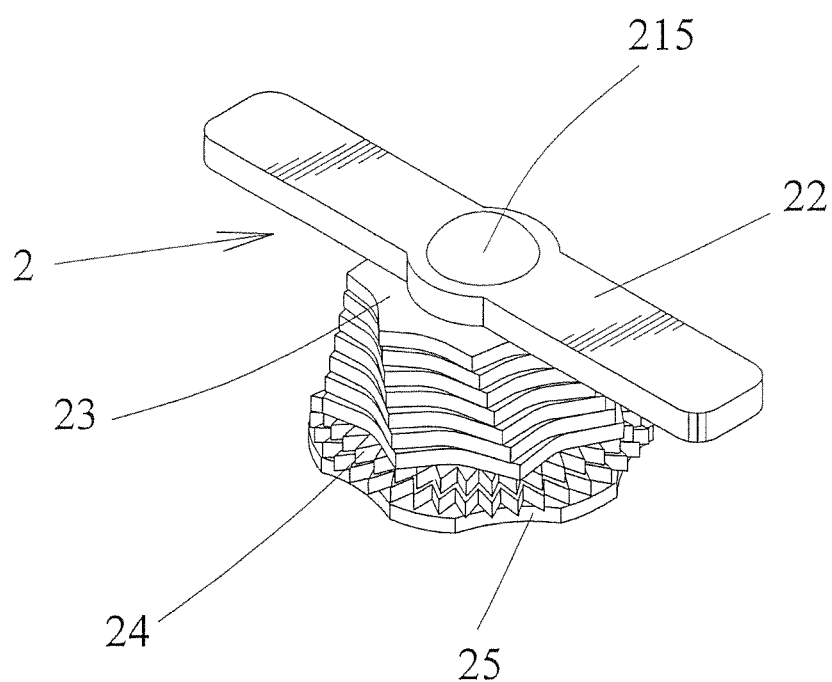
FIG. 3 is a perspective view of an inner grinding member of an embodiment according to the present invention.
Figure 4:
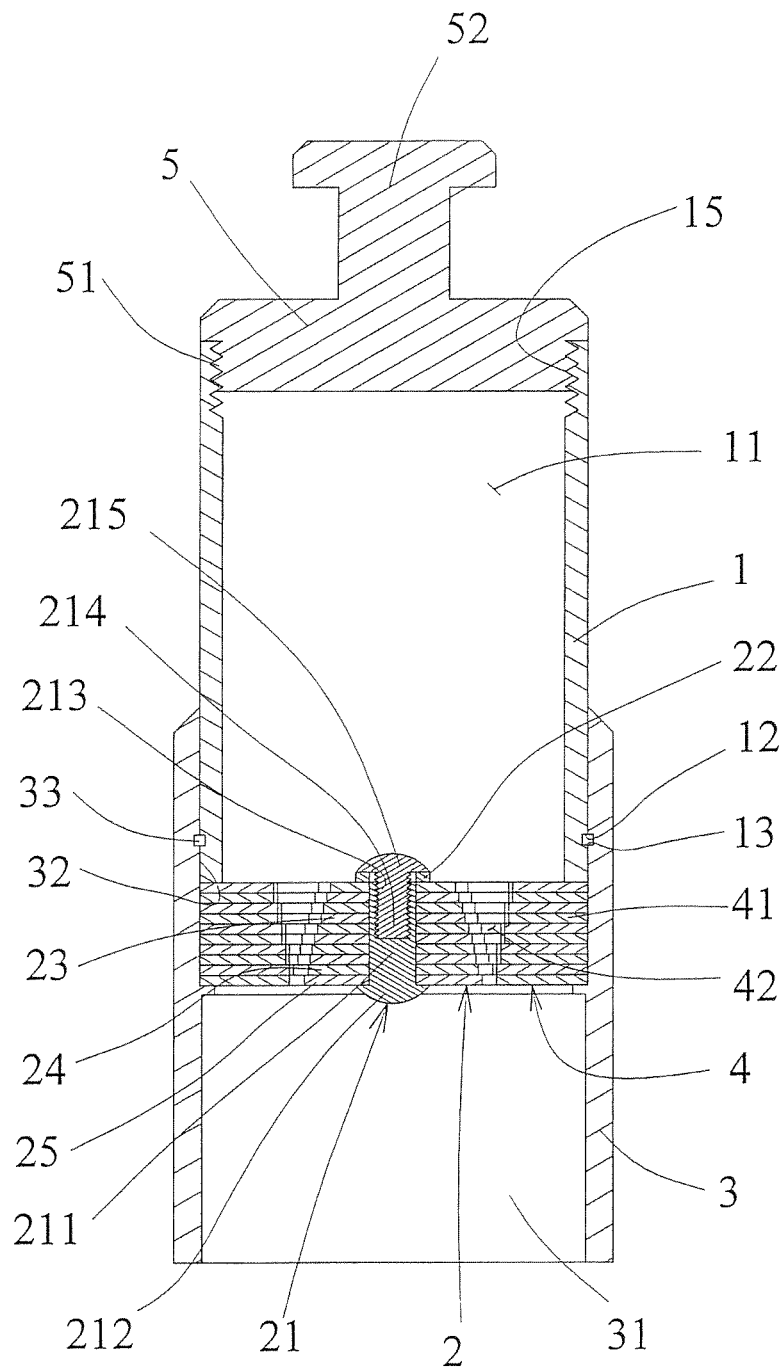
FIG. 4 is a front cross sectional view of an embodiment according to the present invention.
Figure 5:
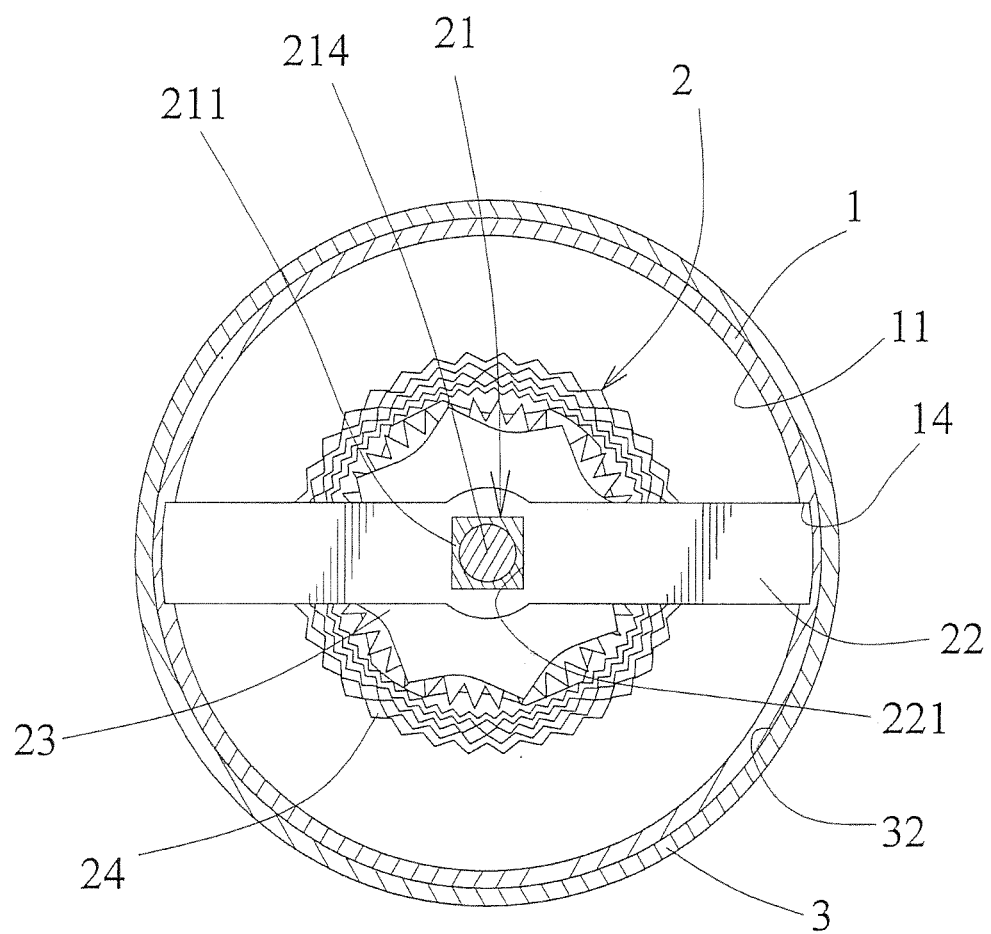
FIG. 5 is a top view of a cross section of an embodiment according to the present invention.

Refer to FIG. 2, FIG. 3 and FIG. 4, the inner grinding member 2 is composed of a fixing shaft 21, a positioning piece 22, a plurality of grinding blades 23, a plurality of toothed discs 24 and a bottom pad 25. The fixing shaft 21 is formed by a polygonal rod 211, a first fixing block 212 disposed on one end of the rod 211, and a fastening hole 213 arranged at the other end of the rod 211. One end of a fastener 214 is connected to the fastener hole 213 of the rod 211 while a second fixing block 215 is formed on the other end of the fastener 214. A polygonal insertion hole 221 is mounted on a center of the positioning piece 22 and the shape of the insertion hole 221 is corresponding to the shape of the fixing shaft 21. As shown in FIG. 5, the two ends of the positioning piece 22 are mounted in the mounting holes 14 on the bottom edge of the container body 1 respectively. The grinding blades 23 are arranged under the positioning piece 22 and overlapped with one another. The lower grinding blade 23 is having a larger diameter than the upper grinding blade 23. And the two adjacent grinding blades 23 are disposed in the way that star-shaped teeth 231 of the upper grinding blade 23 is not overlapped with the star-shaped teeth 231 of the lower grinding blade 23. Thus the shape of the inner grinding member 2 is helical. A polygonal insertion hole 232 whose shape is corresponding to the shape of the fixing shaft 21 is disposed on a center of each grinding blade 23 and is inserted by the fixing shaft 21 correspondingly. The toothed discs 24 are arranged under the lowest grinding blade 23 and overlapped with each other. Each toothed disc 24 has a plurality of tiny teeth 241 around the circumference and a polygonal insertion hole 242 at a center thereof. The shape of the polygonal insertion hole 242 is corresponding to the shape of the fixing shaft 21. The toothed discs 24 are of different sizes and the lower disc 24 is larger than the upper disc 24. The bottom pad 25 is set under the lowest toothed disc 24 and having a plurality of curved portions 251 and a polygonal insertion hole 252. The curved portions 251 are set on the circumference at an equal interval while the polygonal insertion hole 252 is arranged at a center of the bottom pad 25 and having the shape corresponding to that of the fixing shaft 21. The polygonal rod 211 of the fixing shaft 21 is passed through the insertion hole 221 of the positioning piece 22, the hole 232 of each grinding blade 23, the hole 242 of each toothed disc 24 and the hole 252 of the bottom pad 25. Thus the first fixing block 212 set on one end of the rod 211 is against the bottom pad 25 while the other end of the rod 211 is passed through the positioning piece 22 and the fastener 214 is fastened into the fastening hole 213 on the other end of the rod 211 so as to make the second fixing block 215 on the end of the fastener 214 against the positioning piece 22. Thus positioning piece 22, the grinding blades 23, the toothed discs 24 and the bottom pad 25 are firmly clamped and positioned between the first fixing block 212 and the second fixing block 215 to be integrated into one part.

The base 3 includes a hollow material-out space 31 on a center thereof, a connection portion 32 with a larger inner diameter, and a circular groove 33 disposed on an inner wall of the connection portion 32. The connection portion 32 is arranged above the material-out space 31 and is used for mounting the bottom side of the container body 1. The C-shaped retaining ring 13 of the container body 1 is mounted in the circular groove 33 correspondingly.

The outer grinding member 4 is formed by a plurality of circular grinding blades 41 overlapped with one another. Each circular grinding blade 41 is of the same size and having a round hole 42. The inner grinding member 2 is located in the round holes 42 of the circular grinding blades 41. A plurality of teeth 43 is arranged around the round hole 42 of each circular grinding blade 41. The diameter of the round hole 42 is decreased gradually from the upper circular grinding blade 41 to the lower circular grinding blade 41. The circular grinding blades 41 are attached to one another firmly.

The top cover 5 is covered over the receiving space 11 of the container body 1. An outer threaded portion 51 is formed on an edge of the bottom side of the top cover 5. The outer threaded portion 51 is engaged with the inner threaded portion 15 formed on the sidewall of the upper part of the receiving space 11 of the container body 1. A handle 52 is arranged at a center of a top surface of the top cover 5.

While being assembled, the outer grinding member 4 is set in the base 3. Then two ends of the positioning piece 22 of the inner grinding member 2 are mounted in the two mounting holes 14 on the bottom edge of the container body 1. Next the bottom end of the container body 1 is arranged into the connection portion 32 of the base 3 and the C-shaped retaining ring 13 in the circular groove 12 of the container body 1 is mounted and locked into the circular groove 33 of the base 3 correspondingly. Then the top cover 5 is covered on the top of the container body 1. The assembly of the grinder of the present invention has been completed.

While in use, use, granular spices such as peppercorns, salt, etc are filled into the receiving space 11 of the container body 1 and the top cover 5 is arranged at the top of the container body 1 to cover the receiving space 11. Then the base 3 is held by one hand while the container body 1 is held by the other hand of the user. A force is applied by the wrist to drive the container body 1 and the base 3 rotating clockwise and counterclockwise respectively and repetitively. At the moment, the inner grinding member 2 and the outer grinding member 4 mounted between the container body 1 and the base 3 are also driven to move. By the grinding blades 23 and the exposed star-shaped teeth 231 of the inner grinding member 2 worked together with the circular grinding blade 41 of the outer grinding member 4, granular spices such as peppercorns, salt, etc. are moved helically and ground gradually by multiple layers of the grinding blades 23. Thus the granular spices are precisely broken and ground into fine grains. Next the fine grains of the spices are further ground into smaller grains or even powder by a smaller gap between the tiny teeth 241 of the toothed discs 24 and the teeth 43 of the circular grinding blades 41. Therefore the spices are added to foods to enhance food flavor.

The grinding blades 23 and the toothed discs 24 exert torque on the fixing shaft 21 due to collision and friction between granular spices and them during the grinding process. The positioning piece 22, the grinding blades 23, the toothed discs 24 and the bottom pad 25 of the inner grinding member 2 are firmly clamped and positioned between the first fixing block 212 and the second fixing block 215 at two ends of the fixing shaft 21. And the fastening positions of the positioning piece 22, the grinding blades 23, the toothed discs 24 and the bottom pad 25 with the fixing shaft 21 are on two end of the fixing shaft 21 axially. Thus the fastening of the positioning piece 22, the grinding blades 23, the toothed discs 24 and the bottom pad 25 of the inner grinding member 2 is not affected by the fixing shaft 21 under the torsion. The design prevents the positioning piece 22, the grinding blades 23, the toothed discs 24 and the bottom pad 25 of the inner grinding member 2 from falling off while in use.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A spice grinder comprising
a container body with a hollow receiving space;
a base connected to a bottom of the container body and having a hollow material-out space;
an inner grinding member and an outer grinding member, both mounted between the container body and the base and arranged correspondingly to each other;
wherein the inner grinding member includes a plurality of grinding blades overlapped with one another; teeth around a circumference of each of the grinding blades are not overlapped; an insertion hole is mounted on a center of each of the grinding blades while a rod of a fixing shaft is inserted through the insertion hole of each of the grinding blades correspondingly; a first fixing block is formed on one end of the rod while the other end of the rod is arranged with a fastening hole used for mounting a fastener; a second fixing block is formed on one end of the fastener not connected to the rod; the grinding blades of the inner grinding member are clamped and positioned between the first fixing block of the fixing shaft and the second fixing block.

2. The device as claimed in claim 1, wherein the inner grinding member further includes a plurality of overlapped toothed discs are arranged under the lowest grinding blade; each of the toothed discs is arranged with a plurality of tiny teeth around a circumference thereof and an insertion hole at a center thereof; the rod of the fixing shaft is inserted through the insertion hole of each of the toothed discs correspondingly so that the toothed discs of the inner grinding member are clamped and positioned between the first fixing block of the fixing shaft and the second fixing block.

3. The device as claimed in claim 2, wherein the inner grinding member further includes a positioning piece and a bottom pad; the positioning piece is disposed above the grinding blades and having an insertion hole at a center thereof; the bottom pad is arranged under the toothed discs and having an insertion hole at a center thereof; the rod of the fixing shaft is inserted through the insertion hole of the positioning piece and the insertion hole of the bottom pad correspondingly so that the positioning piece and the bottom pad of the inner grinding member are clamped and positioned between the first fixing block of the fixing shaft and the second fixing block.

4. The device as claimed in claim 3, wherein two mounting holes are arranged at a bottom edge of the container body, opposite to each other; two ends of the positioning piece of the inner grinding member are mounted into the mounting holes of the container body respectively.

5. The device as claimed in claim 3, wherein the insertion hole of the positioning piece, the insertion hole of each of the grinding blades, the insertion hole of each of the toothed discs, and the insertion hole of the bottom pad are all polygonal insertion holes while a shape of the rod of the fixing shaft is polygonal corresponding to a shape of the polygonal hole so as to be inserted through the polygonal insertion holes of the positioning piece, the grinding blades, the toothed discs, and the bottom pad correspondingly.

6. The device as claimed in claim 1, wherein the grinding blades having different sizes and overlapped with one another while the lower grinding blade is larger than the upper grinding blade.

7. The device as claimed in claim 6, wherein the outer grinding member includes a plurality of circular grinding blades overlapped with one another; a plurality of teeth is arranged around a round hole of each of the circular grinding blades while the inner grinding member is mounted in the round holes of the circular grinding blades; a diameter of the round hole of each of the grinding blades is decreased gradually from top to bottom.

8. The device as claimed in claim 1, wherein the outer grinding member includes a plurality of circular grinding blades overlapped with one another; a plurality of teeth is arranged around a round hole of each of the circular grinding blades while the inner grinding member is mounted in the round holes of the circular grinding blades.

9. The device as claimed in claim 1, wherein a circular groove is disposed on a lower part of the container body and a retaining ring is mounted in the circular groove of the container body; a connection portion with an inner diameter larger than an outer diameter of the container body is arranged above the material-out space of the base and used for mounting the bottom side of the container body; a circular groove is disposed on an inner wall of the connection portion of the base and the retaining ring of the container body is mounted in the circular groove of the base correspondingly.

10. The device as claimed in claim 1, wherein the spice grinder further includes a top cover covered over the container body; an inner threaded portion is formed on a sidewall of an upper part of the receiving space of the container body while an outer threaded portion is formed on an edge of a bottom side of the top cover; the outer threaded portion is engaged with the inner threaded portion; a handle is arranged at a top surface of the top cover.

* * * * *